May 12, 1959  J. R. GROVES  2,885,782
VACUUM EJECTOR FOR DENTAL DEBRIS
Filed June 11, 1956  2 Sheets-Sheet 1
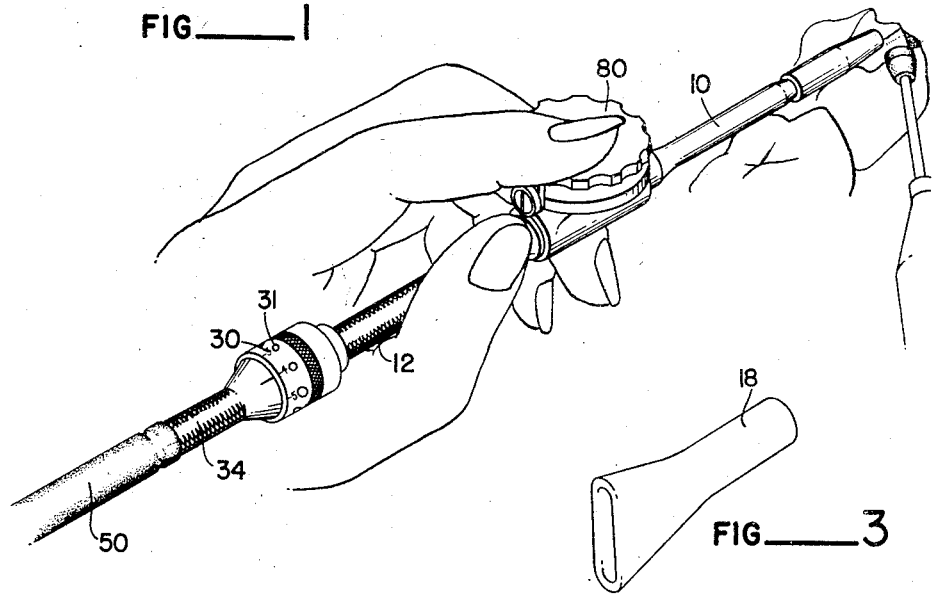
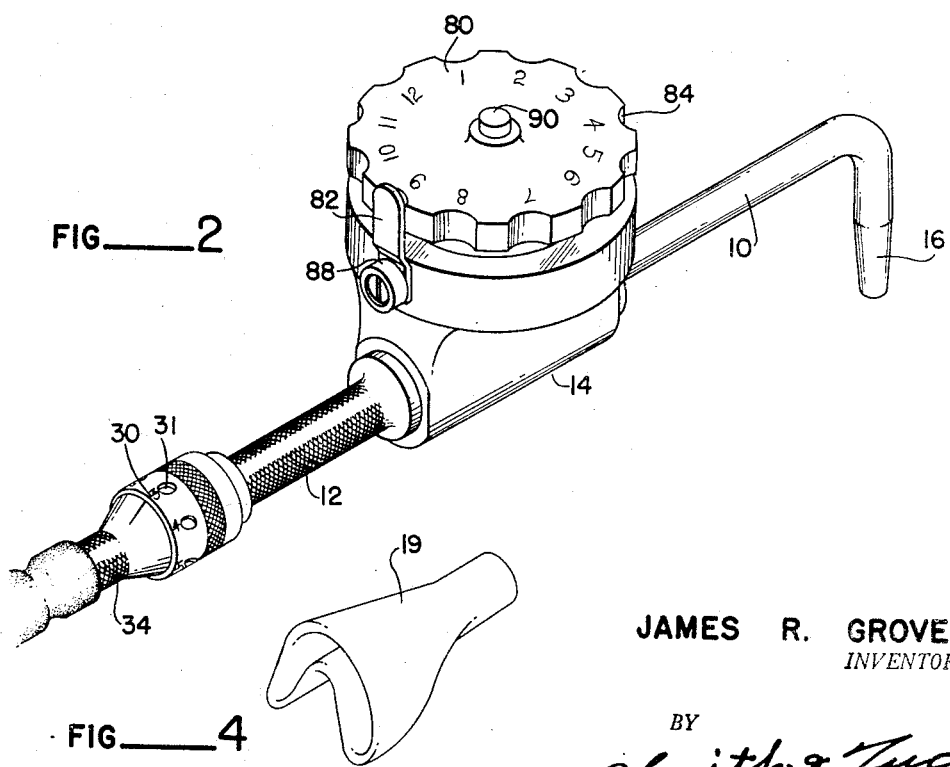
JAMES R. GROVES
*INVENTOR.*
BY
*Smith & Tuck*

May 12, 1959  J. R. GROVES  2,885,782
VACUUM EJECTOR FOR DENTAL DEBRIS
Filed June 11, 1956  2 Sheets-Sheet 2
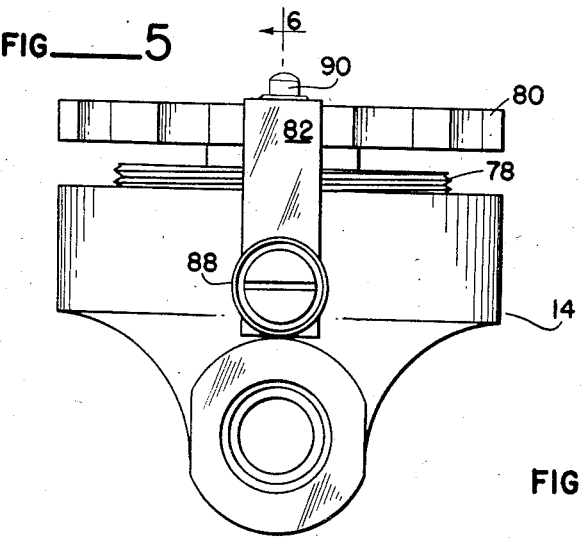
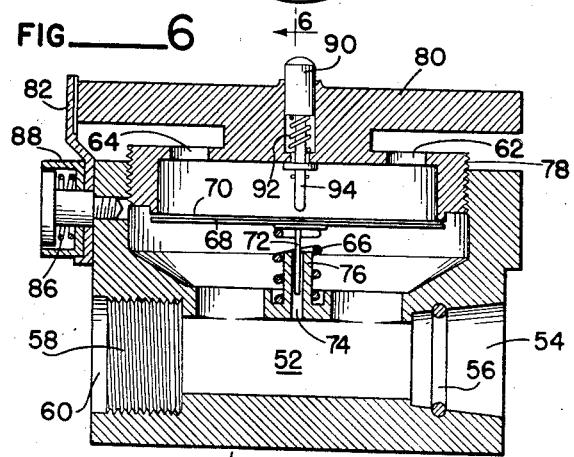
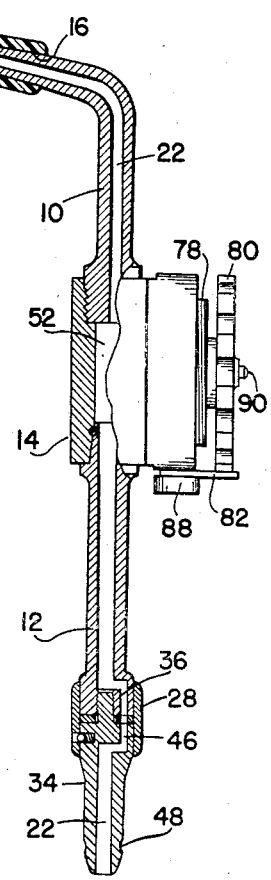
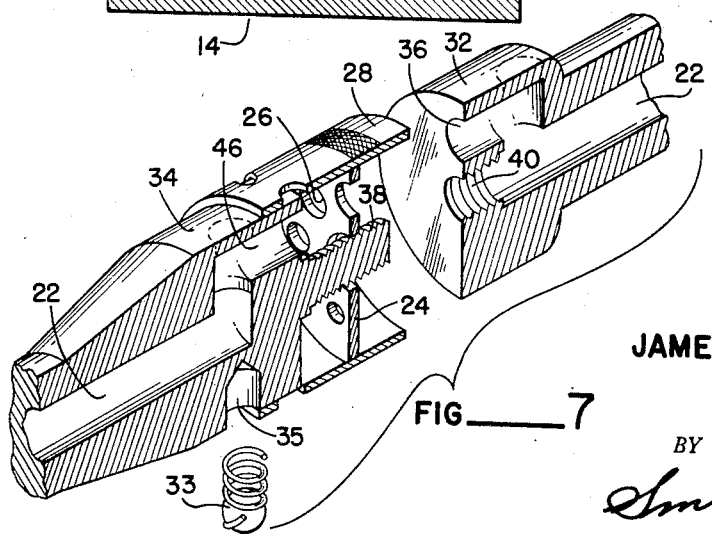
JAMES R. GROVES
*INVENTOR.*
BY
*Smith & Tuck*

United States Patent Office 2,885,782
Patented May 12, 1959

2,885,782

VACUUM EJECTOR FOR DENTAL DEBRIS

James R. Groves, Seattle, Wash.

Application June 11, 1956, Serial No. 590,572

9 Claims. (Cl. 32—33)

This present invention relates to the general art of dental ejectors, or siphons, and more particularly to an ejector designed to remove dental debris by suction without the use of water. The device is generally similar in appearance to the ordinary dental hand piece and is to be connected, for use, to a source of negative pressure usually of the type where a small motor drives a vacuum pump which in turn is directly connected to the hand piece by suction tubing. A characteristic of the equipment is that the outline of the nozzle, which can be varied for different teeth, should be small enough to lie normally within the margins of the tooth being worked upon and the terminal portion of the hand piece should be so constructed that, when the nozzle itself is in the optimum position, it can be easily held by a nurse or assistant in such a manner as not to hinder the operation of the dentist nor in any way obscure his vision.

In the past a number of attempts have been made to solve the problem of removing dry grindings or other dental debris from the teeth in order to avoid the use of water and the flushing of the often sharp materials through the mouth. A common means employed is to use an air blast. This is objectionable, in that the sharp dust is driven into the eyes, nose and skin of both the dentist and the patient. Further, if the tooth pulp is exposed, the sharp particles may cause considerable pain to the patient. A secondary use of this equipment is to remove water and saliva from under a dental rubber dam. In this present instance I have avoided the use of any bulky or otherwise undesirable equipment and have provided that only a small diameter tube should actually be inserted within the oral cavity. To the end of the suction tube is connected a yieldable tip made of rubber or some of the yieldable plastic materials. The equipment must be of relatively small size so it will not obscure the vision of the dentist. This present equipment in no way hampers the operation of the dental hand piece, as can so easily occur when the evacuation equipment is operably secured to the hand piece. It is therefore believed that this present equipment provides a most satisfactory solution of this perplexing problem and will thus be found to be a real contribution in the advancement of this field of endeavor.

The principal object of this present invention is to provide an ejector for dry dental debris, which equipment is so proportioned as to remove the debris directly from the tooth as it is produced by the dental burr or other equipment used by a dentist.

A further object of this invention is to provide an ejector for dental debris which is in no way secured to the dentist's hand piece and which will not hinder his free use of the same.

A further object of this invention is to provide interchangeable yieldable tips adapted to engage the surface of the tooth being worked upon but which, because of their small size, will not hinder the dentist in his operation.

A further object of this invention is to provide a dental debris ejector having a nozzle which normally is smaller than the outline of the tooth being worked upon and which, because of its small sized suction opening, can be supplied with a high degree of suction by a relatively small vacuum pump.

A further object of this present invention is to provide means associated with the hand piece, which permits of varying the effective vacuum passageway through the same to the end that the operator can control the amount of air taken in at the nozzle of the device.

A further object is to provide an automatic relief valve within the hand piece so that, should the nozzle become covered as by tissue in the oral cavity of the patient, a diaphragm valve member will be displaced and admit atmospheric air into the suction line, thus automatically preventing any excessive suction pressure which might be painful to the patient.

A further object of this invention is to provide a release means communicating with a vacuum line which can be adjusted to control the extent of the relief opening and to further provide this device with manual means operable from the outside of the device so that the operator can, at will, actuate the device if the automatic opening does not function quick enough to satisfy the operational conditions.

Further objects, advantages and capabilities will be apparent from the description and disclosure in the drawings, or may be comprehended or are inherent in the device.

In the drawings:

Figure 1 is a perspective view illustrating the manner in which my present equipment is employed;

Figure 2 is a perspective view illustrating the various parts which constitute the hand piece of my device;

Figures 3 and 4 illustrate types of nozzle members which have been found to be satisfactory for use with this equipment;

Figure 5 is an end elevation of the vacuum relieving unit associated with my device;

Figure 6 is a vertical sectional view taken along the line 6—6 of Figure 5;

Figure 7 is a bracketed view, in perspective, and sectioned along its axis, of the means employed to control the effective opening in the vacuum line;

Figure 8 is a longitudinal sectional view through the hand piece of my device and showing the vacuum path therethrough.

Referring more particularly to the disclosure in the drawings, the tubular members 10 and 12, which are joined ogether by housing 14 of the vacuum release unit, constitute the main components of the hand piece. The overall size of these units should be so proportioned that the hand piece will conform to the usual practice in dentistry, in that it be of the size convenient to handle and arranged so that it may be operated by the dentist or his assistant without interfering with the application and use of the usual dental hand piece or the various small tools used by the dentist, such as cleaning instruments and the like. For working on different teeth, it may be desirable to modify the form of member 10, and it will be noted in Figure 1 of the drawings, this member has been shown as having a straight tubular portion, while in Figures 2 and 8 the same is shown as curved. In its various forms, however, it is desirable that tube 10 be provided with a tapering end, as 16, so that the various nozzles, as 18, 19 and 20, may be easily and fully seated on the end so as to prevent any air leaks at this juncture.

As operational conditions vary through such a wide range depending upon the patient, the form of the tooth and the position of the tooth, it is very desirable that the dentist have full control of this device at all times. This device operates on the general principle that it can remove from a tooth cavity the small particles of tooth materials which have been loosened by the various dental instruments or by the burrs used in the hand piece. Actual removal of this debris is caused by the inrush of air endeavoring to balance the vacuum created within the vacuum passageway 22. Because of these factors it becomes very desirable for the dentist to have a device in which the amount of vacuum drawn on the tip or nozzle can be pre-set, and this is achieved in the device shown in sectional view in Figure 7 and also shown exteriorly in Figures 1 and 2 and in section in Figure 8. A preferred way of providing means to control the size of the vacuum passageway 22 is to provide an orifice plate, as 24, having a plurality of various sized orifices 26. Plate 24 is fixedly secured to an adjusting sleeve 28. This sleeve positions plate 24 normal to the axis of the hand piece and is further provided with a plurality of indices 30. These indices are appropriately numbered so as to indicate the size of the orifice in use.

Associated with the members on sleeve 28 are a plurality of openings 31 which serve to provide a locking or resisting means for sleeve 28 in association with the spring-urged detent or ball 33 normally positioned within recess 35 in member 34. Sleeve 28 is a free rotatable fit upon the two coacting abutment members 32 and 34. Portion 32 is a component, normally, of tube 12 which is given an increased diameter in order to provide the passageway 36 which, in turn, communicates with the vacuum passageway 22. Members 32 and 34 are secured in abutting relationship with plate 24 disposed between them by means of a threaded stud 38 formed as part of one of the units and adapted to threadedly engage the other, as in the threaded opening 40. A preferred arrangement is that illustrated in Figure 7 in which the threaded stud 38 is formed as part of member 34 and is axially disposed with respect to the same.

The positioning of stud 38 on the axis of the device requires that the communicating passageway through the device must be offset, as indicated at 36 in member 32 and at 46 in member 34. It is further necessary that threaded members 38 and 40 must be so proportioned as to insure the axial alignment of the by-pass passageways 36 and 46. Passage 46 communicates with the continuation of passage 22 formed in member 34. Member 34 is preferably configured, as is common, by an annular groove at 48 so as to accept in operating relationship the vacuum tube 50 which normally is a flexible tube of rubber or some of the various rubber substitutes.

Experience has indicated that with any suction device there often occur times when the nozzle may momentarily brush against the tender skin in the oral cavity and many times, due to the suction being constantly applied, this delicate skin may entirely block the nozzle opening and be thereafter drawn into the passageway, to a degree, which is at least very painful to the patient. To meet this sometimes distressing condition, an automatic release means has been provided. This unit is probably best illustrated in Figure 6 and is shown in considerable detail in other views. The device consists essentially of a housing member 14 which provides a through passageway 52, which is a component of the vacuum passageway 22. At one end of this passageway it is provided with a tapered seat, as 54, adapted to receive the end of tubular member 22, sealing means as the O-ring 56 is provided to insure against leakage at this point. At its opposite end passageway 52 is provided with, preferably, a threaded seat 58 and a counterbored portion, as 60, in which is seated portion 10 of the nozzle unit. In some units it may be desirable to employ interrupted threads to facilitate changing tube portion 10. In normal use passageway 52 is merely a portion of the main vacuum passageway 22. However, when the vacuum pressure within passageway 22 builds up to what has been determined as an undesirable pressure, the relief valve mechanism is brought into play and atmospheric air is brought in through the relief openings 62 and 64 so as to, in effect, vent the vacuum line and cause a complete drop in pressure at the nozzle.

In any automatic arrangement, it is necessary, of course, to have the device inoperative during normal use; consequently a compression spring is provided at 66 which tends, at all times, to hold the diaphragm valve 68 into sealing contact with its seat 70. Diaphragm valve 68 is positioned by a centrally disposed spindle 72 which in turn is guided within an axial hole 74 in boss 76. Boss 76 also provides the positioning means for compression spring 66. In order to yieldably position valve 68 to the end that compression spring 66 can be overcome by the atmospheric air pressure when nozzle 20 becomes clogged, means are provided for moving valve 68 and its seat 70 vertically. A convenient means to achieve this end is the threaded engagement shown at 78 between housing member 14 and valve seat member 80. It follows that, as the valve seat is raised, spring 66 will become more fully extended and in this way more readily overcome. This arrangement therefore provides a convenient means of adjustment so that the device can be pre-set to relieve the negative pressure in passageway 22 whenever it becomes greater than the predetermined maximum. This spring setting can be calibrated and then reference made to the number dial, shown best in Figure 2, so that the desired pressure setting can be readily achieved.

This valve setting can be maintained by the detent member 82, which can be seated in any one of the desired notches 84 and be maintained in that position by the compression spring 86. When it is desirable to readjust, the pressure dial 89 can be merely turned to the new setting and stop member 82 will be cammed out of the groove 84, which is positioned against the pressure of spring 86 and when the new position is obtained, this spring will again seat member 82 in the newly selected position. It will be apparent, it is believed, that where a large change is to be made the housing member 88 may be grasped and be pulled out, carrying with it member 82 against spring 86 and then the dial 89 can be turned without successively engaging stop member 82.

It has been found desirable to provide the operator with a direct manual control of disc valve 68. Such a need often occurs when it becomes immediately apparent that the skin of the patient's mouth has been engaged. When this occurs, the operator needs to only press inwardly on plunger 90 against the compression spring 92 and the downwardly extending rod 94 will contact the center of disc 68, thus causing spring 66 to be overcome and valve 68 raised from its seat 70. This action vents tube 22 to atmosphere through the various ports as 62 and 64.

It is believed that it will be clearly apparent from the above description and the disclosure in the drawings that the invention comprehends a novel construction of a vacuum ejector for dental debris.

Having thus disclosed the invention, I claim:

1. A hand piece forming a vacuum ejector for dental debris, comprising: a tubular body of a size to be held in a hand having a suction tip on one end, said suction tip being of small size capable of being inserted directly inside of a dental cavity, means for connecting a vacuum pump to the other end of said body, a throttling valve in said body manually operable to be set in various positions to change the effective size of the air passageway in said tubular body at the location of said throttling valve, an interrupter valve in said body having a push button for manual control operative to relieve the suction tip end of the air passageway from vacuum upon depression of said push button, said interrupter valve includes a spring-pressed diaphragm normally closing an air passageway to the outside and susceptible to vacuum conditions in the body thereby automatically opening when the vacuum passes a predetermined limit due to blockage of said suction tip and relieving the vacuum in said body by air passing through said outside air passageway.

2. A hand piece forming a vacuum ejector for dental debris, comprising: a body of a size to be held in a hand having a longitudinal air passageway and having a suction nozzle on one end, said body having an interrupter valve automatically operable to relieve the suction nozzle end of the air passageway from vacuum when the vacuum passes a predetermined limit due to blockage of said suction nozzle, and means for connecting a vacuum pump to the other end of said body.

3. The subject matter of claim 2 in which said interrupter valve includes an air passageway from the outside joining said longitudinal air passageway and a diaphragm, spring-pressed to normally close said air passageway and susceptible to vacuum conditions in the body thereby automatically opening when the vacuum passes a predetermined limit due to blockage of said suction tip and relieving the vacuum in said body by air passing through said outside air passageway.

4. The subject matter of claim 3 in which there is a manually operable push button positioned to act on said diaphragm and opening said diaphragm upon manual depression whereby air may pass through said outside air passageway.

5. The subject matter of claim 3 in which the pressure of the spring acting on said diaphragm is manually adjustable to require different degrees of vacuum for operation of the diaphragm and externally observable indicia indicating the adjusted pressure of the spring.

6. A hand piece forming a vacuum ejector for dental debris, comprising: a tubular body of a size to be held in a hand having a removable suction tip on one end, a vacuum pump and a tube connecting the other end of said body with said vacuum pump, a valve in said body manually operable to control the effective size of the air passageway in said tubular body at the location of said valve, said tip being formed of yieldable material and being secured on said tubular body by having a taper to the bore of said tip and the outer surface of the end of the tubular body to which it is secured having a corresponding taper, the exterior surface of the end of said tip and the bore therein have U-shaped contours.

7. A hand piece forming a vacuum ejector for dental debris, comprising: a tubular body of a size to be held in a hand having a removable suction tip on one end, a vacuum pump and a tube connecting the other end of said body with said vacuum pump, a valve in said body manually operable to control the effective size of the air passageway in said tubular body at the location of said valve, said tip being formed of yieldable material and being secured on said tubular body by having a taper to the bore of said tip and the outer surface of the end of the tubular body to which it is secured having a corresponding taper, the exterior surface of the end of the tip and the bore have oblong contours.

8. A hand piece forming a vacuum ejector for dental debris, comprising: a body of a size to be held in a hand having an axial air passageway and having a suction nozzle on one end, said body having in a section thereof a pair of valve members secured together and having aligned valve air passageways offset from the line of said axial air passageway and forming a continuation of said axial passageway in the area of the valve members, an orifice plate rotatable relative the body axis interposed between the valve members and having a series of different sized orifices alignable with said aligned valve passageways according to the rotary position of the orifice whereby an adjustable throttling effect is produced, and means for connecting a vacuum pump to said body on the opposite side of the valve members from said suction nozzle.

9. The subject matter of claim 8 in which said orifice plate is supported by a sleeve rotatably supported by said valve members and having visible indicia registering with indicia on the valve members to indicate the size of orifice between said aligned valve passageways at the various positions of said orifice plate, and spring-pressed detent and recess means between said sleeve and valve members providing tactile indications of registration between said orifices and said aligned valve passageways.

References Cited in the file of this patent

UNITED STATES PATENTS 2,711,586    Groves _____ June 28, 1955

FOREIGN PATENTS 632,608    France _____ Oct. 10, 1927
272,942    Switzerland _____ Apr. 16, 1951